United States Patent
Lin et al.

(10) Patent No.: US 7,771,101 B2
(45) Date of Patent: Aug. 10, 2010

(54) BACKLIGHT MODULE

(75) Inventors: Po-Iem Lin, Hsin-Chu (TW); Ci-Guang Peng, Hsin-Chu (TW); Yueh-Jung Lee, Hsin-Chu (TW); Yu-Chuan Lin, Hsin-Chu (TW); Hsien-Chih Ho, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 187 days.

(21) Appl. No.: 12/122,272

(22) Filed: May 16, 2008

(65) Prior Publication Data

US 2009/0034290 A1 Feb. 5, 2009

(30) Foreign Application Priority Data

Aug. 1, 2007 (TW) ............................... 96128280 A

(51) Int. Cl.
*F21V 7/04* (2006.01)
(52) U.S. Cl. ........................................ 362/612; 362/613
(58) Field of Classification Search ................. 362/612, 362/613
See application file for complete search history.

(56) References Cited

U.S. PATENT DOCUMENTS

| | | | |
|---|---|---|---|
| 6,923,548 B2 | 8/2005 | Lim | |
| 7,476,003 B2 * | 1/2009 | Kim | ............................ 362/231 |
| 2005/0001537 A1 | 1/2005 | West et al. | |
| 2005/0213323 A1 | 9/2005 | Parker | |
| 2007/0070625 A1 * | 3/2007 | Bang | ............................ 362/240 |
| 2009/0251922 A1 * | 10/2009 | Ueyama | ...................... 362/613 |

FOREIGN PATENT DOCUMENTS

| | | |
|---|---|---|
| CN | 101000125 | 7/2007 |
| JP | 2002157909 | 5/2002 |
| TW | 200521535 | 7/2005 |
| TW | 200613847 | 5/2006 |
| WO | WO 2007/032116 | 3/2007 |

OTHER PUBLICATIONS

English language translation of abstract of TW 200613847.
English language translation of abstract of TW 200521535.
English language translation of abstract of JP 2002157909.
English language translation of abstract of CN 101000125.

* cited by examiner

*Primary Examiner*—Sandra L O'Shea
*Assistant Examiner*—Evan Dzierzynski
(74) *Attorney, Agent, or Firm*—Thomas, Kayden, Horstemeyer & Risley

(57) ABSTRACT

A backlight module includes a light guide plate, at least one first lighting element, and at least one second lighting element. The light guide plate has a first side surface and a second side surface opposite the first side surface. The first lighting element is disposed on the first side surface and has at least three light emitting diodes of different colors. The second lighting element is disposed on the second side surface and has at least three light emitting diodes of different colors. The arrangement of the light emitting diodes of the first lighting element is different from the arrangement of the light emitting diodes of the second lighting element.

8 Claims, 5 Drawing Sheets

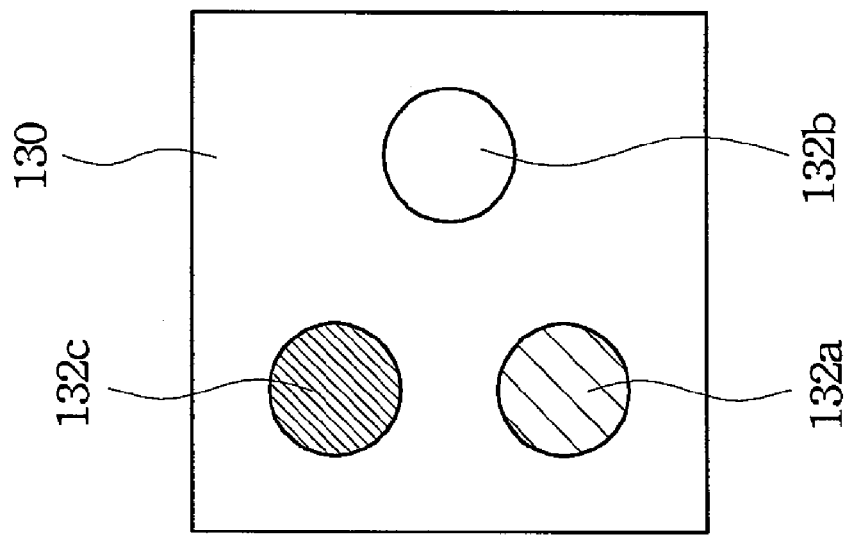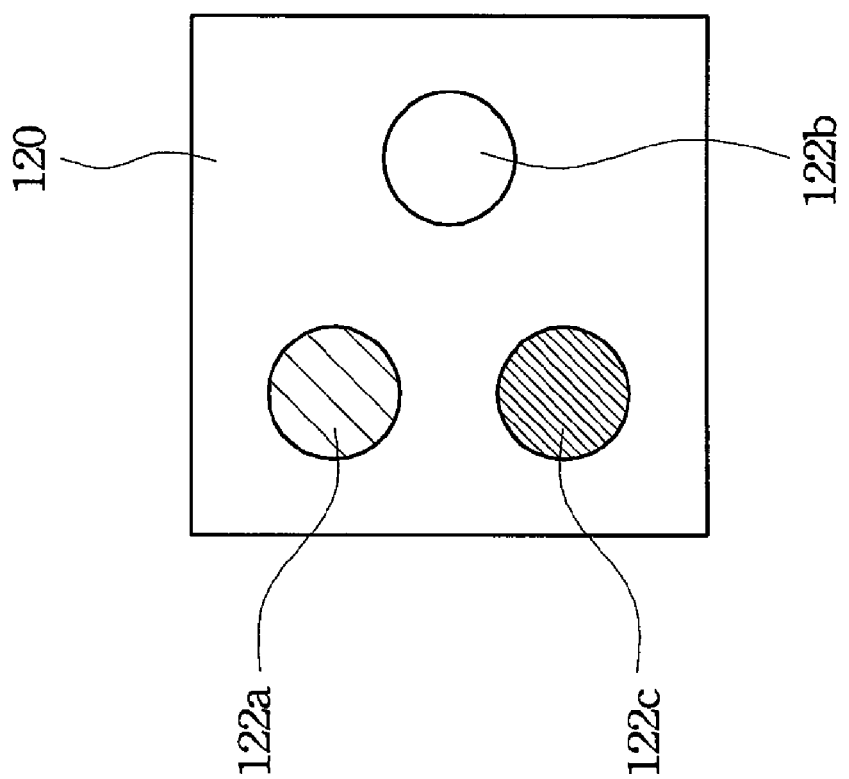
Fig. 3

BACKLIGHT MODULE

RELATED APPLICATIONS

This application claims priority to Taiwan Application Serial Number 96128280, filed Aug. 1, 2007, which is herein incorporated by reference.

BACKGROUND

1. Field of Invention

The present invention relates to illumination. More particularly, the present invention relates to a backlight module.

2. Description of Related Art

Compared to cold cathode fluorescent lamps (CCFLs), light emitting diodes (LEDs) has the advantages of low power consumption, good color rendering property and mercury-free. Therefore, the LEDs have replaced the CCFLs to provide backlight for liquid crystal displays (LCDs).

Generally, the white backlight source of a LCD is performed by mixing light of different colors. Particularly, a combination of LEDs of different colors can produce the impression of white light as the white backlight source of the LCD. However, the mixing of light of different colors is seldom uniform because some or all of the LEDs produce asymmetrical beam patterns. Therefore, the white backlight source of the LCD usually has a colour shift problem.

SUMMARY

The invention releases a backlight module which can provide a uniform light source by adjusting the arrangement of the light emitting diodes.

According to one embodiment of the present invention, a backlight module includes a light guide plate, at least one first lighting element, and at least one second lighting element. The light guide plate has a first side surface and a second side surface opposite the first side surface. The first lighting element is disposed on the first side surface and has at least three light emitting diodes of different colors. The second lighting element is disposed on the second side surface and has at least three light emitting diodes of different colors. The arrangement of the light emitting diodes of the first lighting element is different from the arrangement of the light emitting diodes of the second lighting element.

Accordingly, it can balance the illumination and hue after mixing because the arrangement of the light emitting diodes of the first lighting element is different from that of the second lighting element. Therefore, the lighting elements could compensate for each other and the color shift is avoidable.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 3 shows the side views of the first lighting element and the second lighting element according to another embodiment of the present invention;

DETAILED DESCRIPTION

Figure 1:
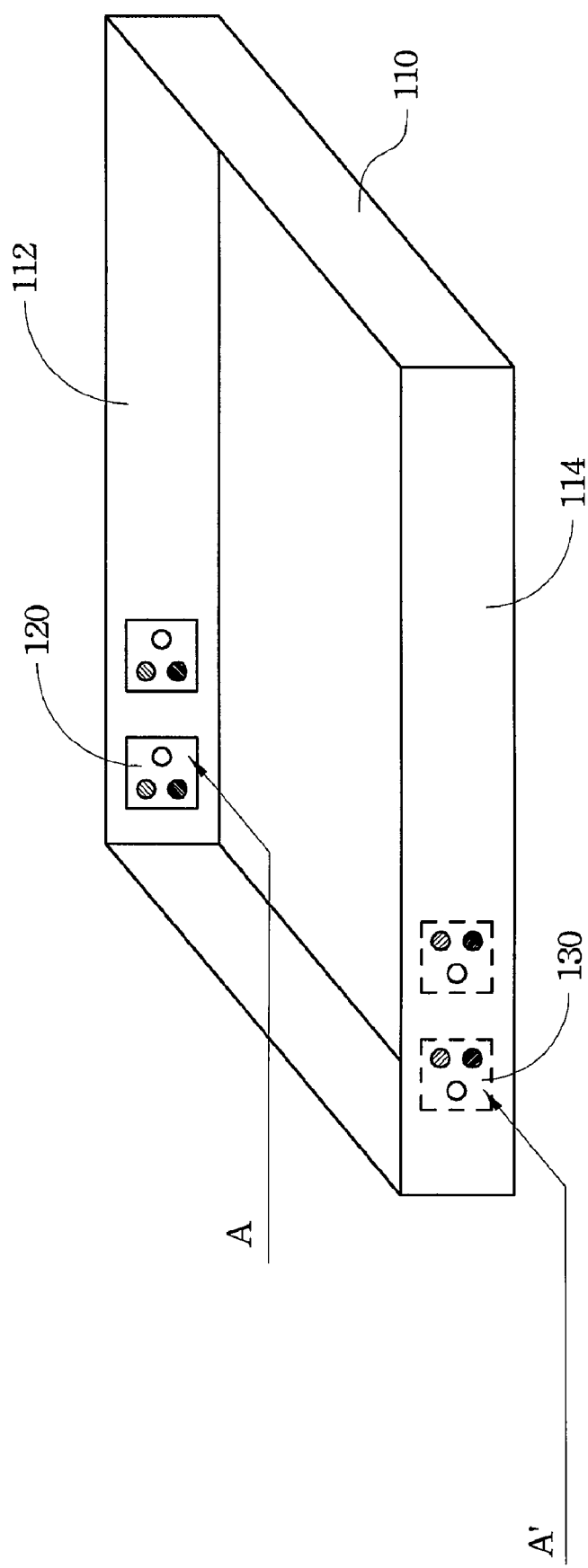
FIG. 1 is a three dimensional view of a backlight module according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a three dimensional view of a backlight module according to one embodiment of the present invention. The backlight module of FIG. 1 includes a light guide plate 110, at least one first lighting element 120 and at least one second lighting element 130. The light guide plate 110 has a first side surface 112 and a second side surface 114 opposite the first side surface 112. The first lighting element 120 is disposed on the first side surface 112. The second lighting element 130 is disposed on the second side surface 114. Specifically, a plurality of the first lighting elements 120 may constitute a lighting bar, and a plurality of the second lighting elements 130 may constitute another lighting bar. The lighting bars are disposed on the first side surface 112 and the second side surface 114 respectively. Continuous lines of FIG. 1 represent surfaces or edges that are visible from view, and dashed lines of FIG. 1 represent surfaces or edges that are hidden from view.

Figure 2:
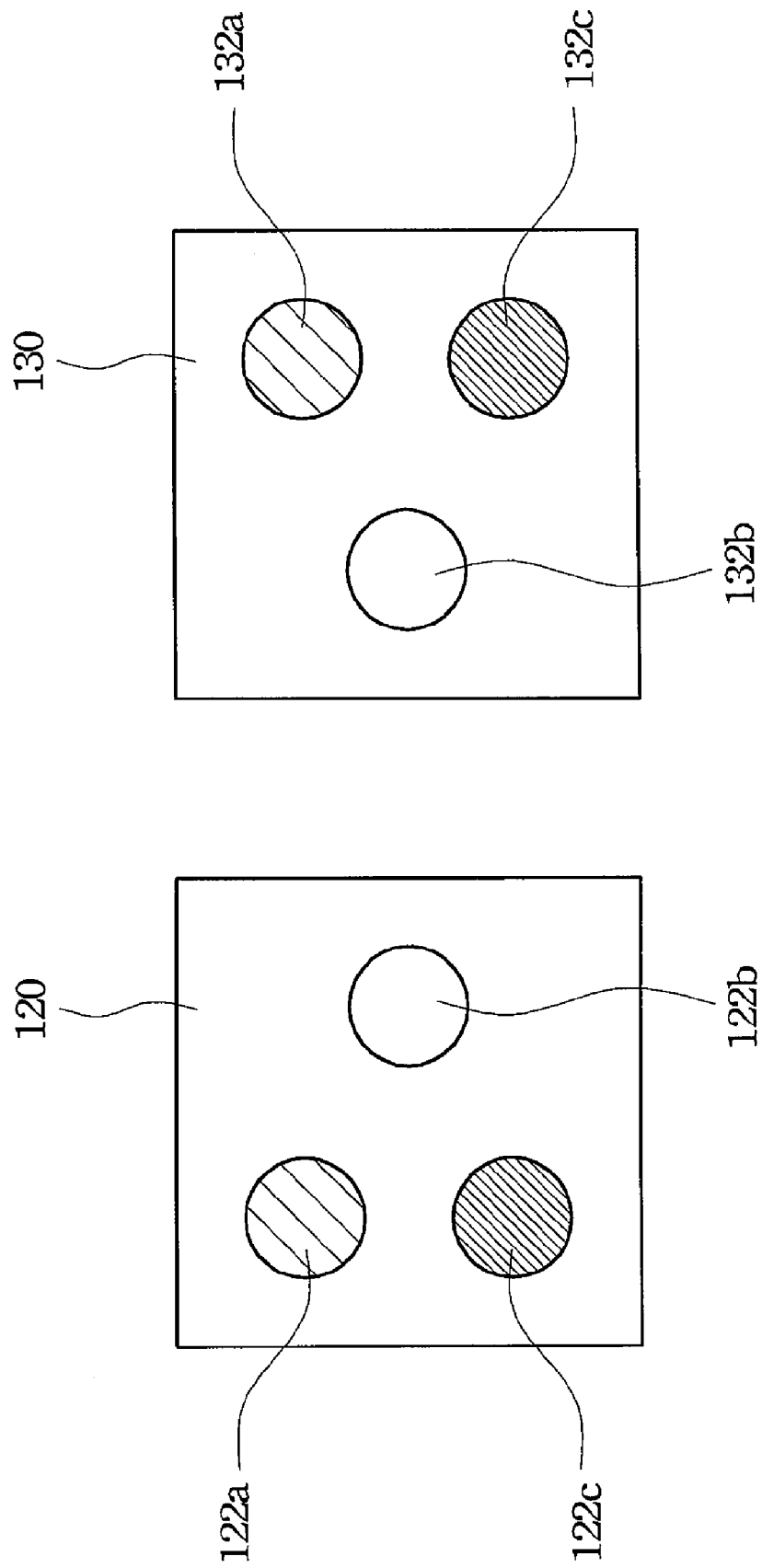
FIG. 2 shows the side views of the first lighting element and the second lighting element taken alone the arrow A and the arrow A' of FIG. 1 respectively.

FIG. 2 shows the side views of the first lighting element 120 and the second lighting element 130 taken alone the arrow A and the arrow A' of FIG. 1 respectively. The first lighting element 120 may have at least three light emitting diodes 122a/122b/122c of different colors. In the present embodiment, the colors of the light emitting diodes 122a/122b/122c of the first lighting element 120 may be, but not limited to, red, green and blue respectively. The second lighting element 130 may have at least three light emitting diodes 132a/132b/132c of different colors as well. Similarly, the colors of the light emitting diodes 132a/132b/132c of the second lighting element 130 may be, but not limited to, red, green and blue respectively. The arrangement of the light emitting diodes 122a/122b/122c of the first lighting element 120 is different from the arrangement of the light emitting diodes 132a/132b/132c of the second lighting element 130.

More specifically, the color arrangement of the light emitting diodes 122a/122b/122c of the first lighting element 120 is horizontally opposite to the color arrangement of the light emitting diodes 132a/132b/132c of the second lighting element 130. That is, the color arrangement of the light emitting diodes 122a/122b/122c of the first lighting element 120 is a left-right reversal of the color arrangement of the light emitting diodes 132a/132b/132c of the second lighting element 130. Accordingly, even if each of the light emitting diodes provides an asymmetrical beam pattern, the first lighting element 120 and the second lighting element 130 can compensate each other for their asymmetrical beam patterns to reduce the chromatic aberration of the white light, generated by the backlight module of FIG. 1.

FIG. 3 shows the side views of the first lighting element and the second lighting element according to another embodiment of the present invention. In the present embodiment, the color arrangement of the light emitting diodes 122a/122b/122c of the first lighting element 120 is vertically opposite to the color arrangement of the light emitting diodes 132a/132b/132c of the second lighting element 130. That is, the color arrangement of the light emitting diodes 122a/122b/122c of the first lighting element 120 is an up-down reversal of the color arrangement of the light emitting diodes 132a/132b/132c of the second lighting element 130.

Figure 4:
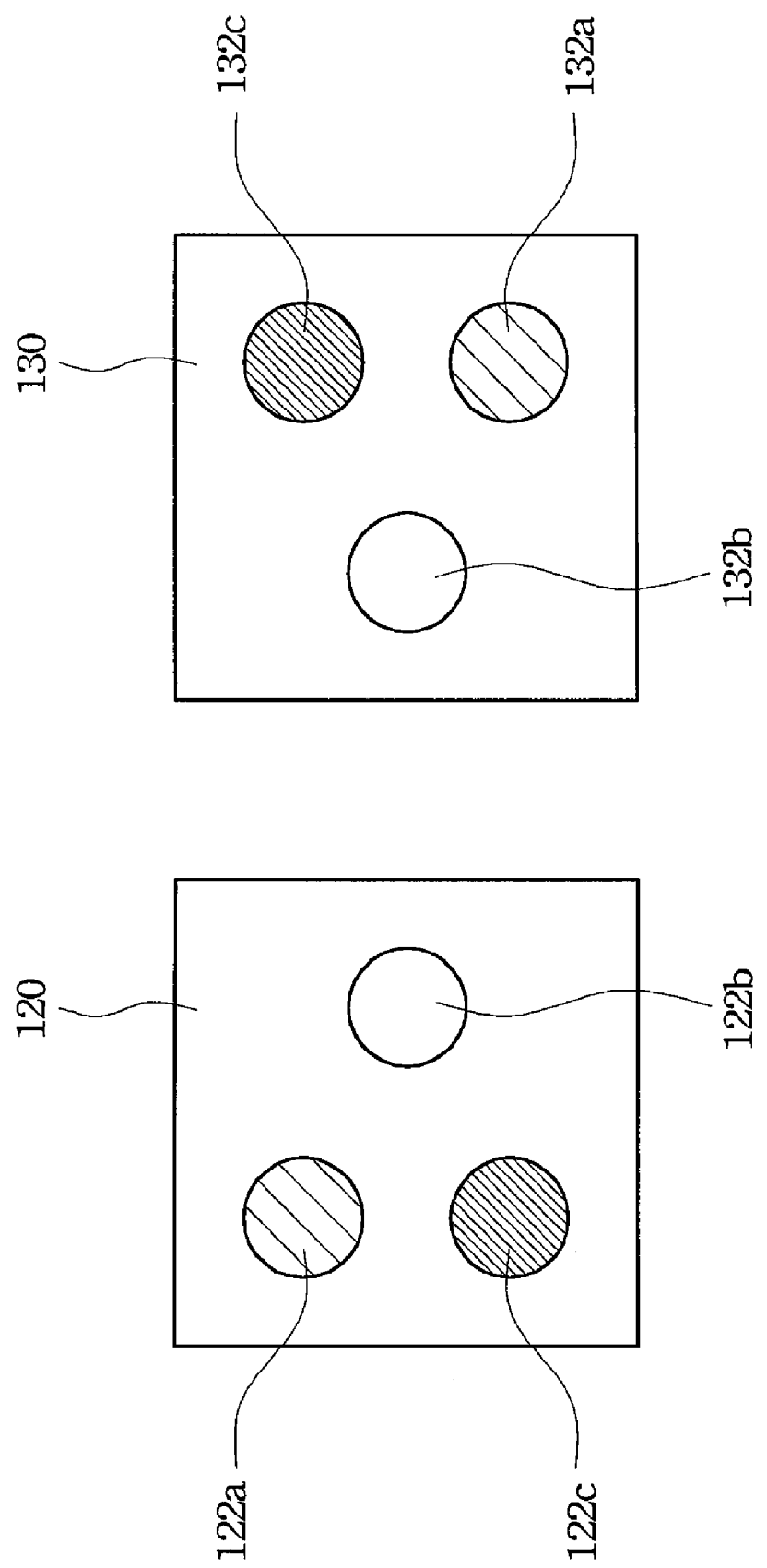
FIG. 4 shows the side views of the first lighting element and the second lighting element according to yet another embodiment of the present invention.

FIG. 4 shows the side views of the first lighting element and the second lighting element according to yet another embodiment of the present invention. In the present embodiment, the color arrangement of the light emitting diodes 122a/122b/122c of the first lighting element 120 is both vertically and horizontally opposite to the color arrangement of the light emitting diodes 132a/132b/132c of the second lighting element 130. That is, the color arrangement of the light emitting diodes 122a/122b/122c of the first lighting element 120 is a diagonal reversal of the color arrangement of the light emitting diodes 132a/132b/132c of the second lighting element 130.

Figure 5:
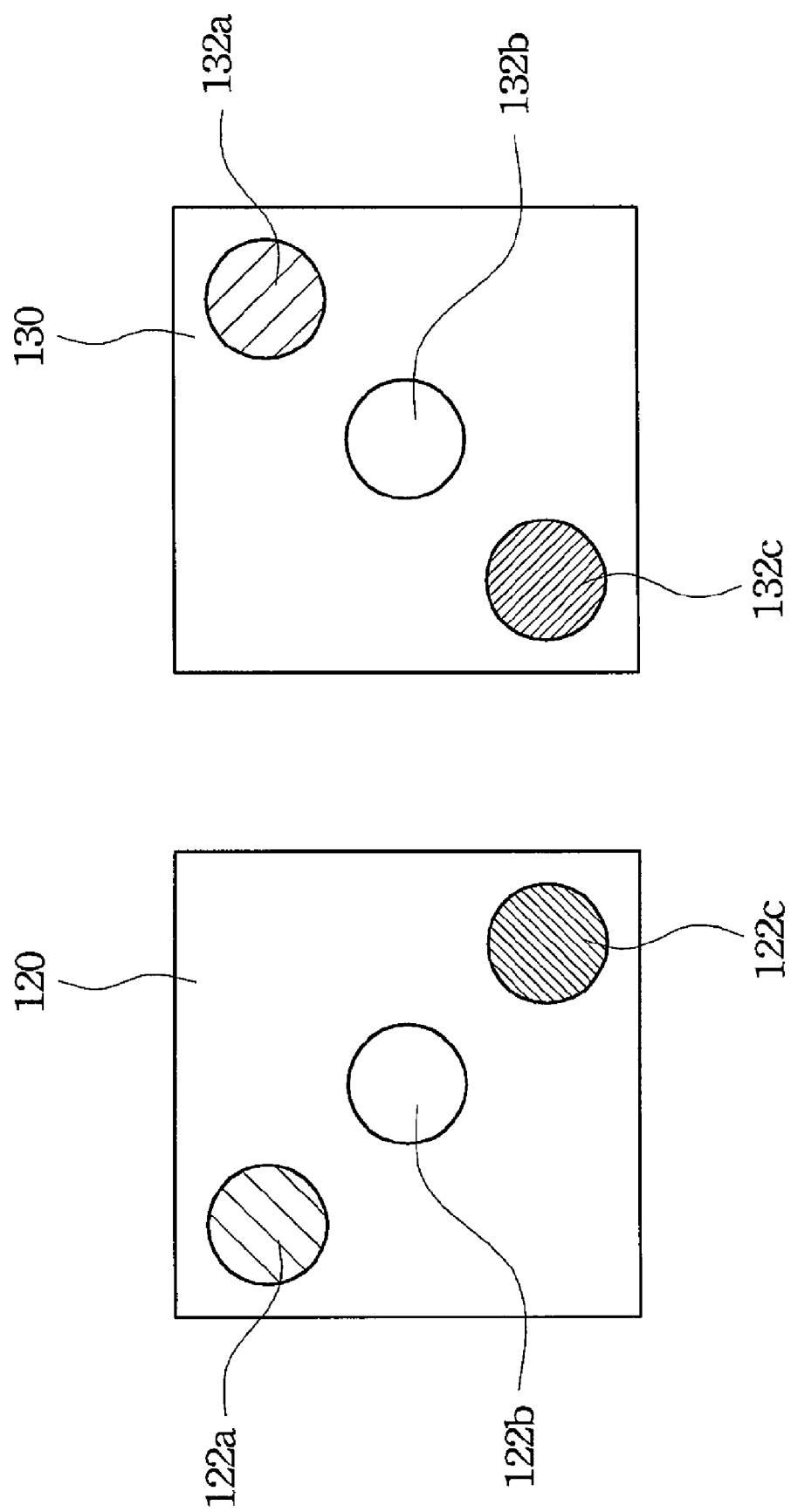
FIG. 5 shows the side views of the first lighting element and the second lighting element according to still another embodiment of the present invention.

FIGS. 2-4 show the light emitting diodes 122a/122b/122c of the first lighting element 120 are arranged in a triangle, and the light emitting diodes 132a/132b/132c of the second lighting element 130 are arranged in a triangle as well. It is easily understood that the above mentioned arranged shape (i.e. triangle) is only one of the examples. FIG. 5 shows the light emitting diodes 122a/122b/122c of the first lighting element 120 may be arranged in an oblique line. Similarly, the light emitting diodes 132a/132b/132c of the second lighting element 130 may be arranged in an oblique line as well.

Tests were run to determine the chromatic aberration of the white light, generated by the backlight module, when the light emitting diodes were arranged in different arrangements. The backlight module used in the sample No. 1 had a light guide plate and two lighting elements disposed on opposite side surfaces of the light guide plate. Those lighting elements each had three light emitting diodes of different colors arranged in a triangle, and their color arrangements were the same. The backlight module used in the sample No. 2 had substantially the same structure as that used in the sample No. 1, but their light emitting diodes were arranged in oblique lines. The backlight module used in the sample No. 3 was the same as that shown in FIG. 2. The backlight module used in the sample No. 4 was the same as that shown in FIG. 5. The chromatic aberration of the white light, generated by each of the samples No. 1-4, was determined as indicated in the following table I.

TABLE I

| | Sample No. | | | |
|---|---|---|---|---|
| | 1 | 2 | 3 | 4 |
| Arranged Shape | Triangle | Oblique Line | Triangle | Oblique Line |
| Color Arrangement | Same | Same | Opposite | Opposite |
| Chromatic Aberration | ~0.010 | ~0.017 | ~0.006 | ~0.008 |

Compared to the samples No. 1-2, the samples No. 3-4 could reduce the chromatic aberrations by about 0.004 and 0.009 respectively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module comprising:
   a light guide plate having a first side surface and a second side surface opposite the first side surface;
   at least one first lighting element disposed on the first side surface and having at least three light emitting diodes of different colors, wherein the three light emitting diodes are arranged in a triangle;
   at least one second lighting element disposed on the second side surface and having at least three light emitting diodes of different colors, wherein the three light emitting diodes are arranged in a triangle, and the color arrangement of the light emitting diodes of the first lighting element is vertically, horizontally, or both vertically and horizontally opposite to the color arrangement of the light emitting diodes of the second lighting element.

2. The backlight module of claim 1, wherein the colors of the light emitting diodes of the first lighting element are red, green and blue respectively, and the colors of the light emitting diodes of the second lighting element are red, green and blue respectively.

3. A backlight module comprising:
   a light guide plate having a first side surface and a second side surface opposite the first side surface;
   at least one first lighting element disposed on the first side surface and having at least three light emitting diodes of different colors, wherein the three light emitting diodes are arranged in a triangle;
   at least one second lighting element disposed on the second side surface and having at least three light emitting diodes of different colors, wherein the three light emitting diodes are arranged in a triangle, and the color arrangement of the light emitting diodes of the first lighting element is a left-right reversal, an up-down reversal, or a diagonal reversal of the color arrangement of the light emitting diodes of the second lighting element.

4. The backlight module of claim 3, wherein the colors of the light emitting diodes of the first lighting element are red, green and blue respectively, and the colors of the light emitting diodes of the second lighting element are red, green and blue respectively.

5. A backlight module comprising:
   a light guide plate having a first side surface and a second side surface opposite the first side surface;
   at least one first lighting element disposed on the first side surface and having at least three light emitting diodes of different colors, wherein the three light emitting diodes are arranged in an oblique line;
   at least one second lighting element disposed on the second side surface and having at least three light emitting diodes of different colors, wherein the three light emitting diodes are arranged in an oblique line wherein the arrangement of the light emitting diodes of the first lighting element is different from the arrangement of the light emitting diodes of the second lighting element.

6. The backlight module of claim 5, wherein the color arrangement of the light emitting diodes of the first lighting element is vertically, horizontally, or both vertically and horizontally opposite to the color arrangement of the light emitting diodes of the second lighting element.

7. The backlight module of claim 5, wherein the color arrangement of the light emitting diodes of the first lighting element is a left-right reversal, an up-down reversal, or a diagonal reversal of the color arrangement of the light emitting diodes of the second lighting element.

8. The backlight module of claim 5, wherein the colors of the light emitting diodes of the first lighting element are red, green and blue respectively, and the colors of the light emitting diodes of the second lighting element are red, green and blue respectively.

* * * * *